Oct. 30, 1934. H. RADZINSKY 1,979,119
DEVICE FOR AIDING IN THE SELECTION OF COSMETICS
Filed Feb. 10, 1934
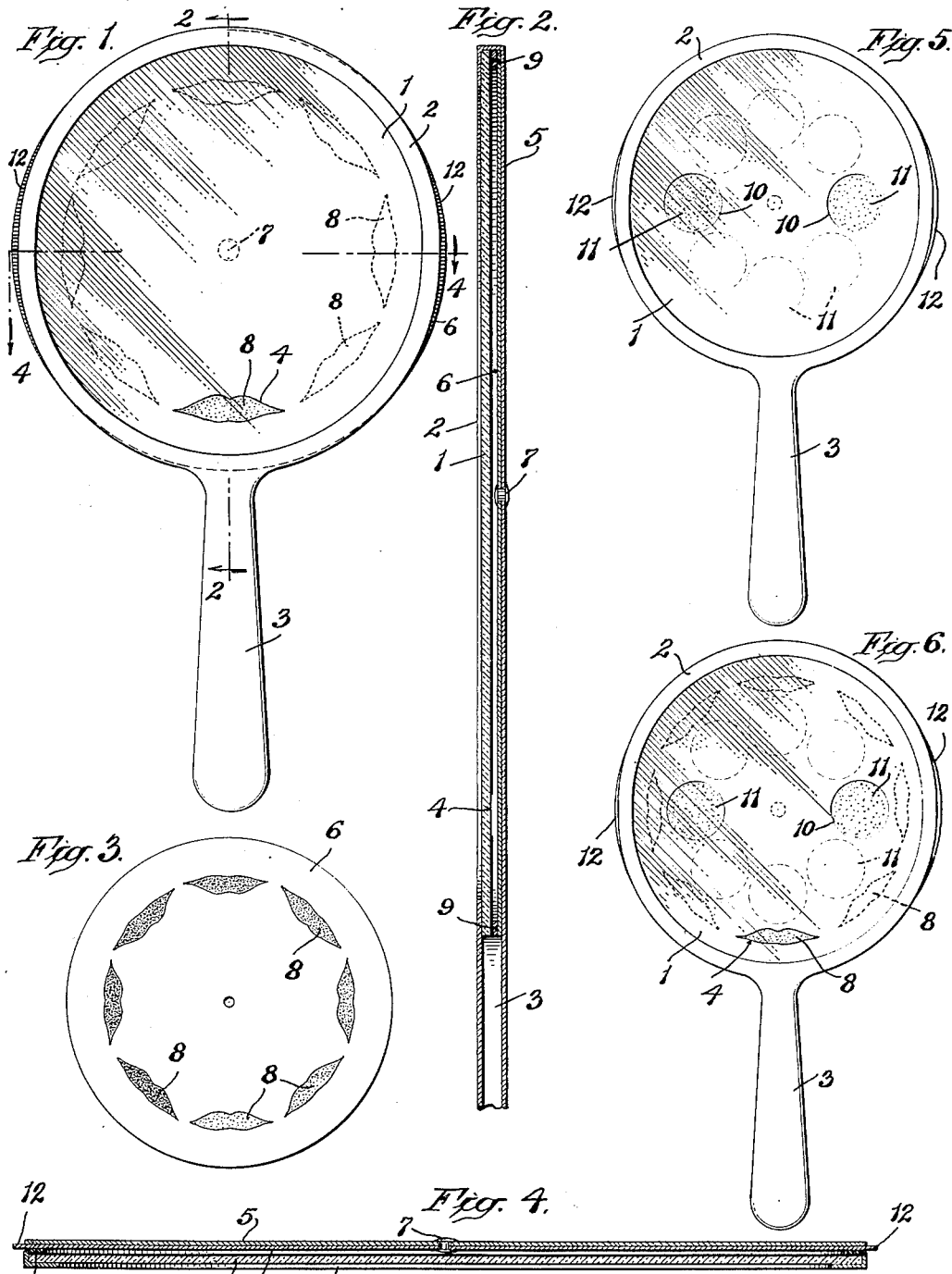
INVENTOR
Harry Radzinsky Patented Oct. 30, 1934

1,979,119

UNITED STATES PATENT OFFICE 1,979,119

DEVICE FOR AIDING IN THE SELECTION OF COSMETICS

Harry Radzinsky, New York, N. Y.

Application February 10, 1934, Serial No. 710,599

9 Claims. (Cl. 35—17)

This invention relates to a device for aiding in the selection of cosmetics and the object of the invention is to provide means by which lipstick, rouge, face powder or the like of the correct shade or color may be easily selected by the person who desires to use it.

As is well known, lipsticks, face powder and rouge are made in different colors or shades to properly co-ordinate with different skin colorings. It is therefore desirable for the user of these cosmetics to select the proper color or shade of cosmetics for her particular skin coloring or complexion. Guide charts and color scheme cards are commonly used to facilitate the selection of properly colored cosmetics but such articles have proven neither accurate or satisfactory since they do not afford a means of comparing the color of the cosmetics with the actual skin coloring of the person who intends to use the cosmetic. It has thus far been found that the only manner in which the correct shade or color of cosmetic can be ascertained is by actual application of the cosmetic to the face of the customer. This is not feasible or sanitary and would require great waste since cosmetics, such as lipsticks for example, are made in a number of colors and the successive trial of the various shades by actual application on the lips would entail time and expense.

My invention contemplates a device by which the colors or shades of cosmetics can be determined by actual comparison with the skin of the user, the cosmetics seeming to actually appear on the face of the user, without actual application thereto.

More specifically, the invention contemplates a mirror provided with one or more apertures or transparent areas in it corresponding to portions of the face, such as the lips or cheeks, and a rotatably mounted sheet member located in back of the mirror and bearing areas of color. These areas of color correspond to cosmetic colors and by rotation of the sheet member any selected color on the card can be placed in registration with the apertures or transparent areas in the mirror. The user, gazing into the mirror, and aligning the cheek and/or lip apertures in the mirror with her cheeks and/or lips immediately observes the effect of the use of cosmetics corresponding in color with those displayed, on her own countenance. By simple rotation of the sheet member to bring successive colors into registration with the mirror apertures or transparent openings, the effect of different cosmetic colors can be quickly ascertained and cosmetics of the proper coloring easily selected.

In the accompanying drawing, Fig. 1 is a front elevation of a device made in accordance with this invention; Fig. 2 is a sectional view on the line 2—2 of Fig. 1, looking in the direction of the arrows; Fig. 3 is a face view of the color disc; Fig. 4 is a sectional view on the line 4—4 of Fig. 1, looking in the direction of the arrows; Fig. 5 is a front view of a modified structure; and Fig. 6 is a front view of a further embodiment of the invention.

In the drawing, 1 indicates a mirror which is shown for convenience in substantially circular or oval form although it may be made of any suitable shape and size. It is for convenience mounted in a frame 2 provided with a projecting handle 3 and a back sheet 5. The mirror is provided with an aperture shown at 4, and in the structure shown in Figs. 1, 2 and 4, the aperture is in the form of a pair of lips. The aperture is made in the mirror either by cutting out a part of the body of the mirror, particularly when the mirror is made of highly polished metal rather than glass, or else by removing a part of the silvering, as is shown at 4 in Fig. 2.

By the term "aperture" used herein both in the specification and in the claims, I wish to be understood as meaning either an opening made physically in the mirror or a transparent area formed in the mirror by the removal of silvering from the back thereof.

Mounted in back of the mirror is a disc-shaped member 6 which may be made of cardboard, metal or of some other similar sheet material and said member 6 is pivoted at 7 to the back plate 5, so that it is rotatable behind the mirror. If desired, a spacing member or washer 9 may be interposed between the back of the mirror 1 and the face of the sheet 6. The disc-shaped member 6 is of such shape that when used in back of the mirror, it will project slightly as shown at 12 in Figs. 1 and 4, out of the mirror frame 2, which is suitably apertured to permit this protrusion of the edge of the disc. These protruding portions 12 of the member 6 enable the member to be easily engaged by the hand of the user so that the disc 6 may be easily rotated. On the face of the disc 6 is a plurality of areas of color, shown clearly at 8 in Fig. 3, each of these areas of color indicating a lipstick coloring.

The areas of color may be in lip form, as shown in Fig. 3, although they need not necessarily be made of such form as long as each of them is of sufficient size to completely cover the aperture 4 in the mirror, when placed in registration with the aperture.

The manner in which the device is used is as follows:

The purchaser of a lipstick, desiring to secure a lipstick of a coloring suitable for her particular complexion gazes in the mirror and holds the aperture 4 in such a position that it appears directly on the lips of her reflected image. She next rotates the disc 6 by engagement of her fingers with one of the projecting parts 12 to bring one after another of the colored areas in registration with the aperture 4, noting as each area of color is moved into registration with the opening 4, the effect of that particular coloring on her lips. The illusion of actual application of coloring to the lips is greatly enhanced if the user in viewing her image in the mirror will close one eye slightly. When this is done, the coloring showing through the aperture 4 appears to be directly applied to the lips and it is thus very simple for the purchaser to quickly determine which of the lipstick colors is most suitable for her particular skin coloring.

In Fig. 5 a modification is shown wherein cheek apertures 10 are shown in the mirror and the disc 6 bears a plurality of colored areas 11 which are intended to represent the different colors of rouges or face powders. With this device, the operation is similar to that previously described, except that the user aligns the two openings 10 with the cheeks of her image appearing in the mirror. In this way, a suitably colored rouge or powder can be selected.

With the arrangement shown in Fig. 5, the color areas 11 on the disc are in pairs, that is to say, two identical spots of color are registered with the apertures 10 at the same time.

The structure shown in Fig. 6 is a combination of the structures of Figs. 1 and 5. That is to say, the mirror is provided with the cheek apertures 10 as well as the lip aperture 4 and the disc 6 is likewise provided with color areas 8 and 11 corresponding to lipstick and rouge colorings respectively. In this way, both rouge and lipstick colorings can be easily determined.

While I have shown the apertures 4 and 10 in the mirror so located that they are intended to be imposed on parts of the reflected image in the mirror, it will be understood that these apertures, or other like apertures may be so positioned on the mirror that they do not actually appear on the reflected countenance of the user but instead may be placed at one side or in close proximity to the countenance, so that the coloring of the cosmetic can be determined without having it actually appear on the reflected image of the user. It is, however, preferable to have the coloring appear on the appropriate part of the reflected image so that the direct applicability of each color of cosmetic where it is actually used can be easily determined.

What I claim is:

1. An article of the character described comprising, a mirror provided with an aperture defining in outline a portion of a person's face, a member movably mounted relative to the aperture and bearing areas of color, said member being adapted to have any one of the colors borne by it placed in registration with the aperture to show therethrough so that the color appearing in the aperture will appear in proper position on the image of the person's face as reflected in the mirror.

2. An article of the character described comprising, a mirror provided with a lip-shaped aperture, a member movable behind the mirror, said member carrying colored areas adapted to be selectively brought into registration with the aperture to show therethrough and thus place a colored representation of a pair of lips on the mirror.

3. An article of the character described comprising, a mirror provided with an aperture defining the outline of a pair of lips, a disc-shaped sheet member mounted relative to the mirror and bearing areas of color, said member being mounted for rotative movement so that any one of the colors borne by it may be placed in registration with the aperture to show therethrough and thus place a colored representation of a pair of lips on the mirror.

4. A device for aiding in the selection of cosmetics comprising a mirror, spaced apertures therein shaped to represent cheeks and located to register with the cheeks of a person looking in the mirror, and a member movably mounted relatively to the mirror for selectively placing colors in said apertures.

5. An article of the character described comprising, a mirror provided with an aperture defining the outline of a pair of lips, a disc-shaped sheet member mounted at the back of the mirror and bearing areas of different colors, said member being mounted for rotative movement so that any selected one of the colors borne by it may be placed in registration with the aperture to show therethrough and thus place a colored representation of a pair of lips on the mirror.

6. A device for aiding in the selection of cosmetics comprising, a mirror provided with a lip-shaped aperture, means for placing the representation of a pair of lips in colors in registration with the aperture in the mirror, and a single movable element for selectively changing the color of said lip representation.

7. An article of the character described comprising, a mirror provided with a transparent portion produced by removal of the mirror silvering, a sheet member movably mounted in back of the mirror and bearing colors, said sheet member being movable relative to the mirror to have one or another of its colors placed in registration with the transparent portion of the mirror to show therethrough, said transparent portion of the mirror being lip-shaped.

8. An article of the character described comprising a mirror provided with an aperture defining the outline of a pair of lips, a disc with colored areas rotatably mounted in back of the mirror for rotation to bring any one of the colored areas in registration with the aperture, said disc having edge portions projecting beyond the edge of the mirror to facilitate manual rotative movement of the disc relative to the mirror.

9. A device for aiding in the selection of cosmetics comprising, a mirror provided with a lip-shaped aperture, and a flat rotatable sheet member bearing a number of colors and movable to register any one of the colors with the lip aperture.

HARRY RADZINSKY.